United States Patent [19]

Richardson et al.

[11] E Re. 30,935

[45] Reissued May 18, 1982

[54] METHOD OF STARTING GAS PRODUCTION BY INJECTING NITROGEN-GENERATING LIQUID

[75] Inventors: Edwin A. Richardson, Houston; Ronald F. Scheuerman, Bellaire, both of Tex.

[73] Assignee: Shell Oil Company, Houston, Tex.

[21] Appl. No.: 195,892

[22] Filed: Oct. 10, 1980

Related U.S. Patent Documents

Reissue of:

[64] Patent No.: 4,178,993
Issued: Dec. 18, 1979
Appl. No.: 902,636
Filed: May 4, 1978

U.S. Applications:

[63] Continuation-in-part of Ser. No. 807,946, Jun. 20, 1977, abandoned.

[51] Int. Cl.[3] ..... E21B 43/25

[52] U.S. Cl. ..... 166/300; 166/305 R; 166/309; 166/312

[58] Field of Search ..... 166/270, 273, 274, 300, 166/305 R, 307, 309, 311, 312

[56] References Cited

U.S. PATENT DOCUMENTS

| | | | |
|---|---|---|---|
| 2,811,209 | 10/1957 | Elkins | 166/311 X |
| 3,171,480 | 3/1965 | Carter | 166/300 X |
| 3,273,643 | 9/1966 | Billings et al. | 166/300 |
| 3,303,880 | 2/1967 | Scott | 166/300 X |
| 3,364,995 | 1/1968 | Atkins et al. | 166/300 X |
| 3,379,249 | 4/1968 | Gilchrist et al. | 166/270 |
| 3,416,605 | 12/1968 | Marsh et al. | 166/300 |
| 3,561,533 | 2/1971 | McKinnell | 166/300 X |
| 3,648,774 | 3/1972 | Kirk | 166/305 R |
| 3,712,380 | 1/1973 | Caffey | 166/300 |
| 3,730,272 | 5/1973 | Richardson | 166/300 X |

*Primary Examiner*—Stephen J. Novosad
*Assistant Examiner*—George A. Suchfield

[57] ABSTRACT

Production is initiated from a gas well which is kept from producing by the hydrostatic pressure of the liquid it contains, by injecting an aqueous liquid that contains reactants which form nitrogen gas within the wall or reservoir and displaces enough liquid out of the well to lower the hydrostatic pressure to less than the fluid pressure in the adjacent portion of the reservoir and cause fluid to flow from the reservoir to the well.

16 Claims, 2 Drawing Figures

METHOD OF STARTING GAS PRODUCTION BY INJECTING NITROGEN-GENERATING LIQUID

Matter enclosed in heavy brackets [ ] appears in the original patent but forms no part of this reissue specification; matter printed in italics indicates the additions made by reissue.

CROSS REFERENCE TO RELATED APPLICATION

The present application is a continuation in part of application Ser. No. 807,946 filed June 20, 1977, now abandoned. The Disclosures of the parent application are incorporated herein by cross reference.

BACKGROUND OF THE INVENTION

This invention relates to treating a well by inflowing a nitrogen-gas-generating solution to cause a gas-effected displacement of liquid from the well. More particularly, it relates to "kicking off", or initiating production from, a gas well which is "dead" due to hydrostatic pressure of the liquid it contains; without the necessity of swabbing the well, or injecting nitrogen or other gas which has been compressed at a surface location.

The need for such production-initiating operations and various procedures for effecting them have been disclosed in prior U.S. patents such as the following U.S. Pat. Nos.:

2,749,990—Suggests introducing a bomb containing a propellant material and a trigger mechanism to initiate burning within the well.

3,073,387—Suggests injecting a solution of foaming agent, shutting in the well to allow a buildup of gas pressure, then opening the well so that liquid is removed by an outflow of foam.

3,164,206—Suggests injecting both a foaming agent (in solid or liquid form) and an effervescent material (such as a gelatin-encased powdered alumina that is contacted by caustic soda in a downhold location).

3,712,380—Suggests that, in reworking and cleaning a well, a mixture of calcium carbide in a liquid hydrocarbon carrier be injected ahead of an aqueous solution of hydrochloric acid and displaced ahead of liquid hydrocarbon into the reservoir formation to there react to generate heat and pressure to induce a flow of fluid into the well.

3,750,753—Suggests effecting a well startup without much gas-pressurization by injecting a slug of gas into the annulus so that some liquid is displaced up and out through a tubing string, injecting an aqueous solution of foaming agent so that more liquid is so-displaced, then reducing the pressure on the annulus so that foam is produced and liquid-containing foam is removed from the annulus.

SUMMARY OF THE INVENTION

This invention relates to treating a gas well from which production is prevented by the hydrostatic pressure of liquid contained within the well. An aqueous liquid which contains or forms a nitrogen-gas-forming mixture of reactants is injected into a well conduit to displace enough liquid to reduce the hydrostatic pressure within the well to less than the fluid pressure in the near-well portion of the reservoir. The injected aqueous liquid is substantially inert to the well conduits and reservoir components and forms or contains a mixture of (a) at least one water-soluble compound which contains at least one nitrogen atom to which at least one hydrogen atom is attached and is capable of reacting with an oxidizing agent within an aqueous medium to yield nitrogen gas and byproducts which are substantially inert to the well conduits and reservoir components, (b) at least one oxidizing agent which is capable of reacting with said nitrogen-containing compound to form said nitrogen gas and byproducts, and (c) an aqueous liquid capable of dissolving those reactants and reaction byproducts. The composition of the nitrogen-gas-forming mixture is correlated with the pressure, temperature and volume properties of the reservoir and well conduits so that the pressure and volume of the generated nitrogen gas is capable of displacing sufficient liquid from the well to reduce the hydrostatic pressure to less than the fluid pressure in the adjacent portion of the reservoir and cause fluid to flow from the reservoir to the well.

In a preferred embodiment, the nitrogen-gas-forming mixture is injected into a production tubing string at a rate such that the gas is formed within and accumulated at the top of the tubing string. The gas is subsequently released to initiate the production of gas from the well and reservoir. Alternatively, the composition of the gas-forming mixture and its rate of injection can be adjusted so at least some of the gas is formed within the pores of the reservoir formation. In another preferred embodiment, an aqueous solution or dispersion of a foam-forming surfactant is injected, before, during or after the injection of the nitrogen-gas-forming mixture, so that a release of gas from the well induces foaming and a foam-transporting of liquid out of the well.

*Where desired, the nitrogen-gas-generating mixture can be injected through a production tubing string at a rate such that substantially all of the nitrogen gas produced by each increment of the injected fluid is produced while that increment of the fluid is in the tubing string and substantially all of the so-generated gas is accumulated at the top of the tubing string. Alternatively, the nitrogen-gas-forming mixture can be injected through a production tubing string at a rate correlated with the rate at which it generates the gas so that a significant proportion of the mixture is injected into the reservoir before it has generated all of the gas it is capable of generating.*

DESCRIPTION OF THE INVENTION

Figure 1:
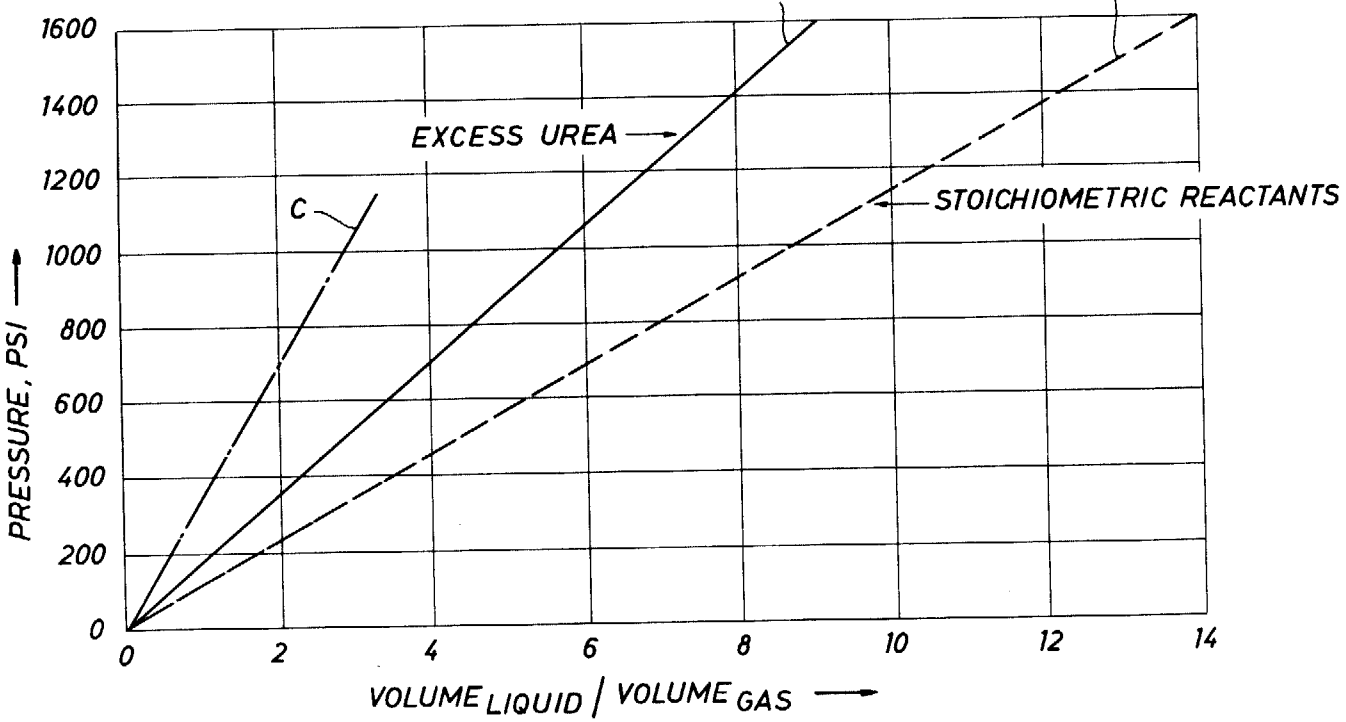
FIG. 1 shows a plot of pressure with increasing ratio of liquid volume to gas volume.

The present invention is, at least in part, premised on the following types of discoveries regarding the generation of nitrogen gas by the interaction of reactants dissolved in an aqueous liquid.

A closed high pressure vessel was connected to a pressure gauge and an inlet line to which two positive displacement pumps were connected. Aqueous alkaline solutions of, respectively, urea and sodium hypochlorite were simultaneously pumped into the pressure vessel. The reaction of the urea and hypochlorite within the vessel generated nitrogen gas and caused an increase in pressure. Measurements were made of the increasing pressure and increasing volumes of gas and liquids, until the pressure reached about 2,000 psi (the limits of the pumps used).

To assist in evaluating the results th equation of state for an ideal gas was used in the following manner: The equation in simple form is $$PV_g=(n_a+n_N)RT \quad (1)$$

where

P=pressure of the gas, psi $V_g$=volume of gas $n_a$=moles of air in the vessel and inlet lines at room temperature and pressure at the start of the test.

$n_N$=moles of $N_2$ gas produced by the reaction

R=1.2-psi/mol—°K.

T=temperature, °K.=300 in these tests Sense $$n_N=C_oV_l \quad (2)$$

where $V_1$=volume of liquid used in the test, liters $C_o$=amount of $N_2$ produced/liter, moles/liter and $$n_a=(P_aV_v)/RT \quad (3)$$

where $P_aV_v$=air pressure and volume in the system at the start of the test and $$V_v=V_1+V_g \quad (4)$$

a substitution of equations (2) and (3) into (1) provides $$PV_g=[(P_aV_v/RI)+C_oV_1]RT \quad (5)$$

By rearranging and introducing equation (4) to eliminate $V_v$, equation (5) is converted to the more useful form $$P=P_a+(P_a+C_oRT)(V_1/V_g) \quad (6)$$

From equation (6), a linear plot with slope equal to $(P_a+C_oRT)$ and intercept equal to $P_a$ should be obtained when the pressure in the vessel, P, is plotted against the ratio $V_1V_g$. $V_1$ is measured by the pumps and $V_g$ calculated from equation (4).

Such a plot is shown in FIG. 1 for a number of runs. It can be seen that reasonable straight lines are produced; in agreement with equation (6). It should be noted that although some $N_2$ gas dissolves in the liquid, calculations show that less than about 15 percent of the $N_2$ will be dissolved at 2000 psi and thus will be negligible. The data for curve A was derived from a nitrogen-gas-forming mixture containing stoichiometric proportions of the reactants in accordance with the reaction, listed at the top of Table 1. Curve A relates to solutions containing the concentrations listed for tests 4 and 5. Curve B relates to a mixture having the composition shown for Test 6, i.e., containing an excess of urea. Curve C relates to liquid gas ratios and gas pressures which are produced under comparable conditions by completions of the nitrogen-gas-forming reactions of water solutions of three moles per liter of each of ammonium chloride and sodium nitrite.

TABLE I

UREA-HYPOCHLORITE REACTION AT ROOM TEMPERATURE (300° K.)

$CO(NH_2)_2 + 3NaClO + 2NaOH \rightarrow N_2 + 3NaCl + NaCO_3 + 3H_2O$

| | Concentration of Chemicals in Final Mix From Pumps Moles/Liter | | | $N_2$ Gas Produced, $C_o$ Moles/Liter | | |
|---|---|---|---|---|---|---|
| Test | $ClO^{-a}$ | Urea[c] | $OH^{-b}$ | Calc.[d] | Actual[e] | Notes-Conclusions |
| 1 | 1.37 | 0.46 | 1.0 | 0.46 | 0.23 | Excess $OH^-$ in spent solution. |
| 2 | 1.40 | 0.47 | 0.61 | 0.47 | 0.25 | No excess $OH^-$ in spent solution. |
| 3 | 1.40 | 0.47 | 0.61 | 0.31[f] | 0.32 | No excess $OH^-$ in spent solution. $N_2$ produced corresponds to $OH^-$ in reactants. |
| 4 | 1.38 | 0.46 | 0.92 | 0.46 | 0.28 | Final pH = 10.6 |
| 5 | 1.47 | 0.49 | 0.98[g] | 0.49 | 0.28 | Adding NaOH to solution instead of urea solution makes no difference. |
| 6. | 1.35 | 1.04 | 0.91 | 0.45[f] | 0.45 | Used up all $ClO^-$ and $OH^-$ stoichiometrically, This mixture gives most gas/unit liquid volume of all previous mixtures shown. |

[a]Divide by 3 to get stoichiometric amount required for urea.
[b]Divide by 2 to get stoichiometric amount required for urea.
[c]1 mol of urea should give 1 mol of $N_2$.
[d]based on chemical equation above and concentration shown.
[e]based on data from FIG. 1 and Co obtained from equation (6).
[f]based on OH in this run.
[g]NaOH put in with NaClO solution and urea was pumped in 8M urea solution.

The data collected in Table 1 shows the relationship between the experimental value of $C_o$ (the nitrogen gas produced by the nitrogen-gas-forming mixture of reactants) and compares it with the theoretical value. It will be apparent that, when an excess of urea is present, a stoichiometric amount of nitrogen gas based on the concentrations of hypochlorite and hydroxide ions is produced, as indicated in test 6. When stoichiometric amounts of urea based on the amounts of hypochlorite and hydroxide ions are used, the yield of nitrogen is less than the theoretical value, as indicated in tests 4 and 5. Such effects are probably due to an unfavorable equilibrium which is involved in the test apparatus that was used. When excess urea was present, the pH of the aqueous liquid (the spent solution after the reaction was complete) was approximately 8.

HYPOTHETICAL WELL TREATMENT EXAMPLE

The exemplified procedure is believed to be particularly suitable for initiating gas production from a well which had been subjected to a work-over, such as a gravel-packing or sand-consolidating operation, or any other operation which required killing the well. It is assumed that the well contains about 12,000 feet 2⅜ inch tubing string, and is completed into a gas reservoir having a temperature of about 350° F. and a pressure of about 3500 psi. The gas production is to be reinitiated by a treatment involving an injection of from about 1 or 2 tubing string volumes of liquid solution which contains or forms a nitrogen-gas-forming mixture.

A simple equation for calculating the gas pressure as a function of the volume of the solution pumped is shown below. (The derivation assumes that the spent fluid and the produced gas separate as they flow down the tubing, so that only spent liquid is pushed into the formation at the bottom of the well, and all the gas is allowed to accumulate in the top of the tubing string.) The moles of $N_2$ generated in the well is given by $$n_N = C_o V_l \text{ (nomenclature same as given previously)} \quad (7)$$

Thus (for the case when no air is initially in the tubing)

$$PV_g = n_N RT = C_o V_l RT \quad (8)$$

Also $$V_g = D_g(T_v) = (L - D_s)T_v \quad (9)$$

where, $L = D_g + D_s$ = total depth of well, ft.

$D_g$ = ft of gas in the top of tubing $D_s$ = ft of spent solution or brine in tubing $T_v$ = volume of tubing string/ft, bbl/ft.

Substituting $V_g$ from (9) into (8) gives $$P(L - D_s)T_v = C_o V_1 RT \quad (10)$$

Also we have $$BHP = P_{\rho g} D_g + \rho_s D_s \text{—bottom hole pressure in the well} \quad (11)$$

where $\rho_g$ = density gradient of gas $\rho_s$ = density gradient of spent solution, psi/ft depth Since $\rho_g$ is small, equation (11) reduces to $$BHP = P + \rho_s D_s \quad (12)$$

or $$D_s = (BHP - P)/\rho_s \quad (13)$$

Substituting $D_s$ from equation (13) into (10) and rearranging gives $$P\left(L - \frac{BPH}{s} + \frac{P}{s}\right) T_v = C_o V_1 RT$$

or $$\rho_s L - P\,BHP + P^2 = C_o V_l RT(\rho_s/T_v) \quad (15)$$

The final equation is of the form $$CV^1 = P^2 + (A - B)P \quad (16)$$

where $$C = \rho_s C_o RT/T_v \quad (17)$$

$$B = BHP \quad (18)$$

$$A = \rho_s L \quad (19)$$

Applying the above equation to the above well situation using data of Test 6, Table 1, and assuming temperature will be 453° K. (350° F.), we have $$C = 0.5 \text{ psi/ft. } (174 \text{ psi})(453° \text{ K.}/300° \text{ K.})(1 \text{ ft}/0.004 \text{ bbl}) = 32{,}873 \text{ psi}^2/\text{bbl}$$

when $C_o RT_{300° K.} = 174$ psi from FIG. 1

Figure 2:
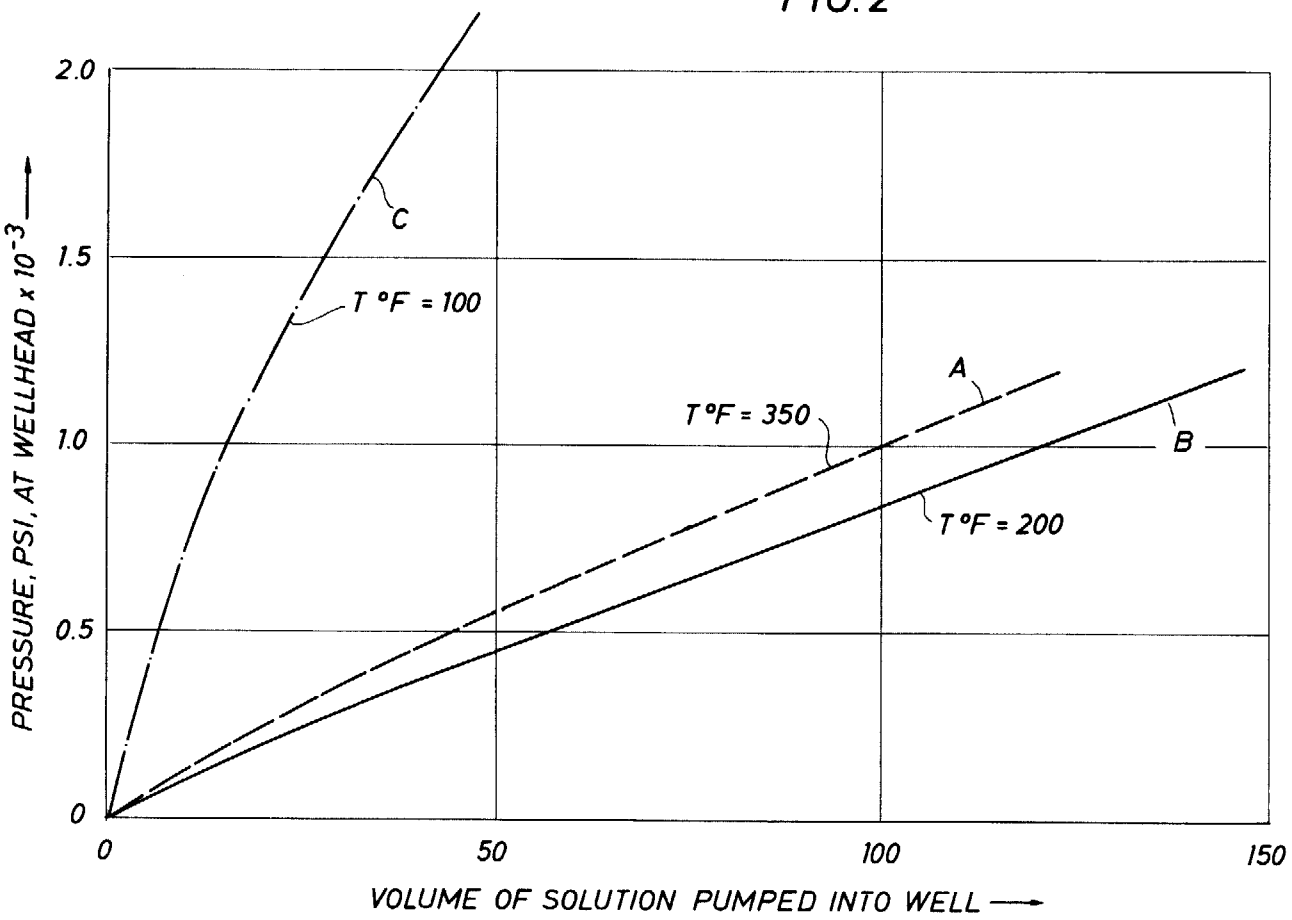
FIG. 2 shows a plot of wellhead pressure with increasing volume of liquid solution pumped into a well.

$B = 3500$ psi $A = 11{,}500$ ft (0.5 psi/ft) $= 5{,}750$ psi $A - B = 2250$ psi These values were substituted into equation (16) to obtain the data shown in Curve A of FIG. 2. It can be seen that to achieve about 500 psi closed in pressure would require 43 bbls of solution which is about 0.8 tubing volume. For 200° F., as shown in Curve B of FIG. 2, 52 bbls would be required or about 1.0 tubing volume. As shown in Curve C of FIG. 2, which is based on similar calculations using data of the type listed in Table 2 relating to a water solution of 3 moles each of ammonium ions and nitrite ions, only about 7 bbls of the more concentrated solution would be required to provide the 500 pounds psi pressure, when the gas temperature is about 100° F.

TABLE 2

AMMONIUM CHLORIDE-SODIUM NITRITE REACTIONS: IN WATER SOLUTION AT VARIOUS TEMPERATURES $NH_4Cl + NaNO_2 \rightarrow N_2 + 2H_2O$ A Unbuffered System - 3 Moles/Liter Starting Concentration of Each Reactant

| Temperature | $N_2$ Generated Moles/Liter, in | | | | |
|---|---|---|---|---|---|
| °F. | ½ hr | 1 Hr | 2 Hr | 4 Hr | 8 Hr |
| 120 | .089 | .174 | .329 | .595 | .999 |
| 140 | .286 | .524 | .896 | 1.39 | 1.92 |
| 160 | .791 | 1.26 | 1.79 | 2.27 | 2.62 |
| 180 | 1.66 | 2.16 | 2.55 | 2.80 | 2.94 |

B Buffered System, 3 Moles/Liter Starting Concentration of Each Reactant 0.5 Moles/Liter Na Acetate Buffer

| Temperature | $N_2$ generated, moles/liter, in | | | | |
|---|---|---|---|---|---|
| °F. | ½ hr | 1 hr | 2 hr | 4 hr | 8 hr |
| 120 | .026 | .052 | .102 | .198 | .371 |
| 140 | .110 | .212 | .395 | .700 | 1.14 |
| 160 | .419 | .735 | 1.18 | 1.69 | 2.17 |
| 180 | 1.22 | 1.73 | 2.20 | 2.53 | 2.75 |

SUITABLE COMPOSITIONS AND PROCEDURES

Water-soluble amino nitrogen compounds, which contain at least one nitrogen atom to which at least one hydrogen atom is attached and are capable of reacting with an oxidizing agent to yield nitrogen gas within an aqueous medium, which are suitable for use in the present invention can comprise substantially any water-soluble ammonium salts of organic or inorganic acids, amines, amides and/or nitrogen-linked hydrocarbon-radical substituted homologs of such compounds as long as the substituted compounds react in a manner substantially equivalent to the parent compounds with respect to the production of nitrogen gas and by-products which are liquid or dissolve to form aqueous liquid which are substantially inert relative to the well conduits and reservoir formation. Examples of such compounds include ammonium chloride, ammonium nitrate, ammonium acetate, ammonium formate, ethylene diamine, formamide, acetamide, urea benzyl urea, butyl urea, hydrazine, phenylhydrazine, phenylhydrazine hydrochloride, and the like. Such ammonium salts, e.g., ammonium chloride, ammonium formate or ammonium acetate are particularly suitable.

Oxidizing agents suitable for use in the present process can comprise substantially any water-soluble oxidizing agents capable of reacting with a water-soluble nitrogen-containing compound such as an ammonium salt or a urea or hydrazine compound as described above to produce nitrogen gas and the indicated types of byproducts. Examples of such oxidizing agents include alkali metal hypochlorites (which can, of course, be formed by injecting chlorine gas into a stream of alkaline liquid being injected into the well), alkali metal or ammonium salts of nitrous acid such as sodium or potassium or ammonium nitrite and the like. The alkali metal or ammonium nitrites are particularly suitable for use with nitrogen-containing compounds such as the ammonium salts.

Aqueous liquids suitable for use in the present invention can comprise substantially any relatively soft fresh water or brine. Such aqueous liquid solutions preferably have a total dissolved salt content of from about 1 to 100 ppm, and a total hardness in terms of calcium ion equivalents of no more than about 50 ppm.

Foam-forming surfactants suitable for use in the present invention can comprise substantially any which are capable of being dissolved or dispersed in an aqueous liquid solution containing the nitrogen containing compound and oxidizing agent and remaining substantially inert during the nitrogen-gas-producing reaction between the nitrogen containing compounds and the oxidizing agent. Examples of suitable surfactants comprise nonionic and anionic surfactants, commercially available sodium dodecylbenzene sulfonates, e.g., Siponate DS-10 available from American Alcolac Company, mixtures of the Siponate or similar sulfonate surfactants with sulfated polyoxyalkylated alcohol surfactants, e.g., the NEODOL sulfate surfactants available from Shell Chemical Company; sulfonate sulfate surfactant mixtures, e.g., those described in the J. Reisberg, G. Smith and J. P. Lawson U.S. Pat. No. 3,508,612; petroleum sulfonates available from Bray Chemical Company; Bryton sulfonates available from Bryton Chemical Company; Petronates and Pyronates available from Sonnoborn Division of Witco Chemical Company; fatty acid and tall oil acid soaps, e.g., Actynol Heads from Arizona Chemical Company; nonionic surfactants, e.g., Triton X100; and the like surfactant materials which are soluble or dispersible in aqueous liquids.

Water-thickening agents suitable for use in the present process can comprise substantially any water-soluble polymer or gel capable of dissolving in an aqueous liquid solution containing the nitrogen-containing compound and oxidizing agent and remaining substantially inert during the nitrogen-gas-producing reaction between them while increasing the viscosity of the aqueous solution to an extent enhancing the effectiveness of said gas in gas-lifting liquid out of a well. Examples of suitable water-thickening agents include Xanthan gum polymer solutions such as Kelzan or Xanflood available from Kelco Corporation; hydroxyethyl cellulose, carboxymethyl cellulose, guar gum and the like thickening agents. Such thickening agents are particularly effective within a well conduit. They retard the rising velocity of gas bubbles so that more liquid is removed by the rising gas, and thus, such thickening agents are particularly effective in treatments in which most of the nitrogen gas is generated within the well.

The correlation between the composition of the nitrogen-gas-forming mixture with the pressure, temperature and volume properties of the reservoir and well components is important. In general, the rate of gas formation tends to increase with increasing temperature and increasing concentration of reactants. With certain reactants the amount of gas production tends to be limited where the pressure is particularly high. By means of calculations and/or simple tests of the type described above, the composition of the gas-forming mixture can be adjusted so that the volume of the liquid which contains or forms that mixture need to be no more than about the volume of the tubing string plus the volume of the annular space between the tubing string and the casing in order to generate an amount of gas that will displace enough liquid to reduce the hydrostatic pressure to less than the fluid pressure in the adjacent portion of the reservoir. Such a liquid can be circulated within the borehole by flowing it into the tubing string while flowing fluid out of the casing without injecting into the reservoir.

Alternatively, in certain situations, it is advantageous to cause a significant amount of flow of gaseous fluid from the reservoir to the well. In such situations the composition of the nitrogen-gas-forming mixture can be adjusted relative to the ambient temperature and the pressure and temperature of the reservoir so that the rate of gas generation is slow enough to allow a significant portion of the gas-forming mixture to be displaced into the reservoir. The generation of gas within the reservoir tends to increase the fluid pressure adjacent to the well and, when gas is released from the well, to ensure a relatively large inflow of gaseous fluid into the well.

One particularly suitable procedure for correlating the composition of the nitrogen-gas-forming mixture with the reservoir properties and the selected duration of the treatment involves the use of an amino nitrogen compound which is a salt of ammonia and an oxidizing agent which is an alkali metal or ammonium salt of nitrous acid as the gas-generating reactants. Such reactants generally react slower than, for example, the urea and hypochloride reactants, and thus can be used in place of the latter to provide (a) a slower reaction rate at a given temperature and concentration or (b) a similar rate of reaction at a higher temperature or concentration. Such reactants can also form relatively concentrated solutions which minimize the amount of water that must be injected to induce the gas generation in the selected location. In addition, since their reaction rate increases with increasing pH, the nitrogen-gas-generating reaction rate of a solution of them can be buffered (a) at a relatively high pH at which the rate is relatively slow at the reservoir temperature by adding, for example, sodium acetate or other compatible buffer providing a near neutral or slightly alkaline solution; or (b) at a relatively low pH at which the rate is relatively fast at the reservoir temperature by adding, for example, a mixture of acidic acid and sodium acetate or other compatible buffer providing a slightly acidic solution.

In addition to being useful for initiating a sustained production of gas from a dead gas well, the present invention can be used to displace a slug of treating liquid into a reservoir and then produce it back out of the reservoir without a need for employing swabbing equipment or gas which has been highly pressurized at a surface location. Such a treatment could comprise, injecting one or more fluids such as an oil solvent and- /or acid, or scale-dissolving liquid with which it is desired to wash the performations and/or near well zone by injecting then backflowing.

The injecting and then backflowing of the treating liquid can be conducted as follows. A sequence of one or more slugs of treating liquid is arranged to precede a slug or volume of the present gas-generating liquid which, if desired, may be followed by a slug or volume of inert aqueous liquid. Then, the sequence of liquids is spotted within or near the bottom of the well being treated; for example, by injecting the liquids sequentially into the well through a tubing string (and/or an annulus around it) so that the liquid already in the well is displaced into the reservoir and continuing the injection until the frontal portion of the treatment liquid is at or near the bottom of the well. Alternatively, the sequence can be so spotted sequentially including the liquids within a stream of fluid which is being circulated into the well (through the annulus or tubing string) and terminating the fluid circulation when the frontal portion of the treating liquid is at or near the bottom of the well. The wellhead is then closed so that gas generated by the gas-generating liquid accumulates above the liquid within the well while it displaces the treating liquid into the reservoir. At least a portion of the so-accumulated nitrogen gas is then released in order to initiate a backflowing of the treating liquid from the reservoir into the well.

As will be apparent to those skilled in the art, where the well depth and/or tubing size is sufficient to accommodate a significant portion of the nitrogen-gas-forming mixture, the composition of such a mixture can be adjusted so that a significant volume of pressurized gas will be formed. And, the injecting and producing of the treating liquid slug can be repeated a plurality of times, by closing the wellhead so the accumulating gas injects the treating liquid slug, releasing gas so that the treating liquid backflowed; and, then again closing the wellhead so that the displacement of treating liquid slug into the reservoir is repeated.

In one preferred procedure for initiating a sustained flow of gas production from a gas well in which production has been prevented by the hydrostatic pressure of liquid in the well, fluid is circulated into the top of one well conduit and out the top of the other until a slug of the gas-generating liquid is spotted within at least one of the conduits. The top of the conduit containing the gas-generating liquid is then closed while the top of the other is left open. As the gas is generated it initially accumulates above the liquid in the so-closed conduit while displacing liquid down through the bottom of that conduit and out through the open top of the other conduit. Where the volume of the so-generated gas is sufficient, and/or where the gas-generating liquid is spotted within both of the conduits, at least some portions of the liquid are displaced by a gas lifting type action of the generated gas. Where the gas-generating liquid is spotted within both of such conduits the tops of both can be left open. And, the gas-generating liquid can be thickened with a water-thickening agent to increase the effectiveness of the gas-lifting of liquid out of the conduits.

In another preferred procedure for initiating a gas flow, a composition of a gas generating liquid is correlated with the temperature and injectivity properties of the reservoir and inflowed into the reservoir in a manner such that a significant proportion of the gas is generated within the reservoir formation. Where desirable, a pair of well conduits such as a tubing string and the annulus between it and a surrounding pipe string can be utilized to relatively rapidly circulate a slug of the treatment liquid to the bottom of the well and then displace that liquid into the reservoir formation in a way which reduces the overall time for which the gas generating liquid is exposed to the reservoir temperature before it has entered the reservoir formation. A particularly suitable gas generating liquid for use in such a procedure is one in which the nitrogen-containing reactant is an ammonium salt and oxidizing reactant is an alkali metal or ammonium nitrite.

What is claimed is:

1. A process for treating a gas well from which production is prevented by the hydrostatic pressure of liquid contained within the well, comprising:

injecting into the well at least one aqueous liquid solution which forms or contains a nitrogen gas-forming mixture of (a) at least one water-soluble compound which contains at least one nitrogen atom to which at least one hydrogen atom is attached and is capable of reacting within an aqueous medium to yield nitrogen gas and byproducts which are substantially inert to the components of the well and reservoir formation, (b) at least one oxidizing agent which is capable of reacting with said nitrogen-containing compound to form said gas and byproducts, and (c) an aqueous liquid which is capable of dissolving or homogeneously dispersing said nitrogen-containing compound, the oxidizing agent and the byproducts of the nitrogen-gas-producing reaction;

correlating the composition of the nitrogen-gas-forming mixture with the pressure, temperature and volume properties of the reservoir and well components so that pressure and volume of the gas which is generated displaces sufficient liquid from the well to reduce the hydrostatic pressure to less than the reservoir fluid pressure; and, initiating gas production from the well by displacing liquid from the well in response to a flow of the pressurized gas formed by the generation of nitrogen gas and allowing gas to flow from the reservoir to the well.

2. The process of claim 1 in which the nitrogen-gas-forming mixture is injected through a production tubing string at a rate such that substantially all of the nitrogen gas produced by each increment of the injected fluid is produced while that increment of the fluid is in the tubing string and substantially all of the so-generated gas is accumulated at the top of the tubing string.

3. The process of claim 1 in which the nitrogen-gas-forming mixture is injected through a production tubing string at a rate correlated with the rate at which it generates the gas to that a significant proportion of the mixture is injected into the reservoir before it has generated all of the gas it is capable of generating.

4. The process of claim 1 in which the nitrogen-containing compound is salt of ammonia and the oxidizing agent is an alkali metal or ammonium nitrite.

5. The process of claim 4 in which the injected solution contains a buffering agent for maintaining a reaction rate increasing relatively low pH or a reaction rate decreasing relatively high pH.

6. The process of claim 1 in which the injection into the well of the nitrogen-gas-forming mixture is accompanied by an injection into the well of an aqueous liquid solution or dispersion of a foam-forming surfactant.

7. The process of claim 1 in which the injection into the well of the nitrogen-gas-forming mixture is accompanied by an injection into the well of an aqueous liquid solution or dispersion of a water-thickening agent.

8. The process of claim 1 in which the nitrogen-gas-forming mixture consists essentially of an aqueous solution of ammonium chloride and sodium nitrite.

9. A well treating process which comprises:

injecting into the well a slug of treating liquid;

injecting into the well behind the treating liquid slug at least one aqueous liquid solution which forms or contains a nitrogen-gas-forming mixture of (a) at least one water-soluble compound which contains at least one nitrogen atom to which at least one hydrogen atom is attached and is capable of reacting within an aqueous medium to yield nitrogen gas and byproducts which are substantially inert to the components of the well and reservoir formation, (b) at least one oxidizing agent which is capable of reacting with said nitrogen-containing compound to form said gas and byproducts, and (c) an aqueous liquid which is capable of dissolving or homogeneously dispersing said nitrogen-containing compound, the oxidizing agent and the byproducts of the nitrogen-gas-producing reaction;

correlating the composition of the nitrogen-gas-forming mixture with the pressure, temperature and volume properties of the reservoir and well conduits so that the pressure and volume of the nitrogen gas which it generates is sufficient to displace a selected volume of liquid into the reservoir;

correlating the volume of the aqueous liquid solution with the depth of the reservoir and the volume of the tubing string and treating liquid slug so that, when the solution is injected behind the slug, the slug is displaced to a depth such that the frontal portion of the treating liquid slug is near the reservoir when the slug and solution have entered the tubing string;

closing the conduits at the top of the well and allowing the generation of nitrogen gas to displace at least a substantial proportion of the treating liquid slug into the reservoir; and, subsequently, producing fluid from the well by outflowing gas generated by the nitrogen-gas-forming mixture, so that the treating liquid slug is backflowed from the reservoir to the well.

10. The process of claim 9 in which the nitrogen-gas-forming mixture consists essentially of an aqueous solution of ammonium chloride and sodium nitrite.

11. The process of claim 9 in which the nitrogen-gas-forming mixture consists essentially of an aqueous solution of urea and sodium hypochlorite.

12. The process of claim 9 in which the nitrogen-gas-forming mixture consists essentially of an aqueous solution of urea and sodium nitrite.

*13. A process for treating a well comprising:*

*injecting into the well at least one aqueous liquid solution which forms or contains a nitrogen gas-forming mixture of (a) at least one water-soluble compound which contains at least one nitrogen atom to which at least one hydrogen atom is attached and is capable of reacting within an aqueous medium to yield nitrogen gas and byproducts which are substantially inert to the components of the well and reservoir formation, (b) at least one oxidizing agent which is capable of reacting with said nitrogen-containing compound to form said gas and byproducts, and (c) an aqueous liquid which is capable of dissolving or homogeneously dispersing said nitrogen-containing compound, the oxidizing agent and the byproducts of the nitrogen-gas-producing reaction;*

*correlating the composition of the nitrogen-gas-forming mixture with the pressure, temperature and volume properties of the reservoir and well components so that pressure and volume of the gas which is generated is capable of displacing at least enough liquid from the well to reduce the hydrostatic pressure to less than the reservoir fluid pressure; and,*

*initiating fluid production from the well.*

*14. The process of claim 13 in which the nitrogen-gas-forming mixture is injected through a production tubing string at a rate such that substantially all of the nitrogen gas produced by each increment of the injected fluid is produced while that increment of the fluid is in the tubing string and substantially all of the so-generated gas is accumulated at the top of the tubing string.*

*15. The process of claim 13 in which the nitrogen-gas-forming mixture is injected through a production tubing string at a rate correlated with the rate at which it generates the gas so that a significant proportion of the mixture is injected into the reservoir before it has generated all of the gas it is capable of generating.*

*16. The process of claim 13 in which the nitrogen-containing compound is salt of ammonia and the oxidizing agent is an alkali metal or ammonium nitrite.*

* * * * *